US 9,840,371 B2

United States Patent
Ho et al.

(10) Patent No.: US 9,840,371 B2
(45) Date of Patent: Dec. 12, 2017

(54) COVER SHIELD SYSTEM FOR A TELESCOPIC CONVEYOR

(71) Applicant: TY-CROP MANUFACTURING LTD., Rosedale (CA)

(72) Inventors: Dennis Keith Ho, Abbotsford (CA); James Ryan Brezden, Lindell Beach (CA)

(73) Assignee: Ty-Crop Manufacturing Ltd., Rosedale, B.C. (CA)

( * ) Notice: Subject to any disclaimer, the term of this patent is extended or adjusted under 35 U.S.C. 154(b) by 0 days.

(21) Appl. No.: 15/176,815

(22) Filed: Jun. 8, 2016

(65) Prior Publication Data

US 2016/0355348 A1 Dec. 8, 2016

Related U.S. Application Data

(60) Provisional application No. 62/172,575, filed on Jun. 8, 2015.

(51) Int. Cl.
*B65G 21/08* (2006.01)
*B65G 21/14* (2006.01)

(52) U.S. Cl.
CPC ............ *B65G 21/08* (2013.01); *B65G 21/14* (2013.01)

(58) Field of Classification Search
CPC ..................................................... B65G 21/08
USPC ...... 198/860.3, 861.1, 812, 735.3, 588, 594, 198/313
See application file for complete search history.

(56) References Cited

U.S. PATENT DOCUMENTS

| | | | | |
|---|---|---|---|---|
| 2,737,885 | A * | 3/1956 | Persson | B07C 1/025 101/236 |
| 3,356,268 | A * | 12/1967 | Swanson | A47G 19/34 222/288 |
| 3,542,187 | A * | 11/1970 | Helmuth | B65G 25/08 198/743 |
| 4,309,808 | A * | 1/1982 | Dean | H05K 13/0473 140/105 |
| 5,682,977 | A * | 11/1997 | White | B65G 21/2063 198/836.1 |
| 8,186,502 | B2 * | 5/2012 | Mackin | B65G 15/26 198/313 |

(Continued)

FOREIGN PATENT DOCUMENTS

DE 4432713 A1 * 3/1996 ............ B65G 21/08

*Primary Examiner* — Leslie A Nicholson, III
*Assistant Examiner* — Lester Rushin
(74) *Attorney, Agent, or Firm* — Sheridan Ross PC

(57) ABSTRACT

A cover shield system for a telescoping conveyor system and an associated telescoping conveyor are provided. The cover is extendable for covering a length of a telescoping portion of the conveyor system. A free end of the cover is connected to the telescoping portion at a far end. A shuttle assembly is biased to retract the cover for storage, for example by rolling the cover into the shuttle assembly under spring action. The shuttle assembly may be movably mounted to the telescoping portion of the conveyor system to allow relative movement of the shuttle assembly and the telescoping portion during telescopic extension/retraction of the conveyor system. The shuttle assembly is also anchored to the base portion at least during the telescopic extension. The cover may include reinforcement bars and/or connecting magnets. An idler roller may bias the cover toward the conveyor frame.

22 Claims, 7 Drawing Sheets

(56) References Cited

U.S. PATENT DOCUMENTS

2013/0062169 A1   3/2013   Johannsen
2014/0110229 A1*  4/2014   Jorgensen .............. B65G 21/08
                                                  198/860.3

* cited by examiner

COVER SHIELD SYSTEM FOR A TELESCOPIC CONVEYOR

CROSS-REFERENCE TO RELATED APPLICATIONS

This application claims the benefit of U.S. Provisional Application No. 62/172,575 filed Jun. 8, 2015, the contents of which are incorporated herein by reference.

FIELD OF THE INVENTION

The present invention pertains to the field of cover shields and in particular to a cover shield for a telescopic or extendable conveyor system.

BACKGROUND

Granular material, such as sand or hydraulic fracturing proppant, is used in bulk quantity in a number of applications. For example, in hydraulic fracturing operations by oil and gas and other industries, fracturing fluid, along with a granular proppant material such as sand and/or ceramics, is pumped into a drill well to create and prop open fractures in rock. Often, activities requiring large amounts of granular material are performed in a remote location, requiring granular material to be shipped in for example by road, rail or water. For such activities, it is desirable to have sufficient and often large amounts of granular material readily available for adequately reliably carrying out operations.

One component of an on-site mobile granular material delivery system is a mobile conveyor, which receives the material from a source such as a delivery truck, barge or rail car and conveys the material to an elevated location such as the input of a storage container. Concerns have been raised around the risk of silicosis due to inhalation of proppant material used in hydraulic fracturing, as well as other fine granular materials. Open conveyor systems may emit large amounts of dust and therefore pose a significant workplace health and safety risk. Dust mitigation is therefore a desirable feature of bulk material handling systems. In addition, the mitigation of the ingress of unwanted material or foreign objects into the material being transported by the delivery system may also be desired.

U.S. Patent Application Publication No. 2013/0062169 discloses a cover for the inner conveyor of the telescopic assembly, wherein the cover comprises a plurality of covered panels to form a continuous cover extending the length of the inner conveyor. The panels have to be folded in the storage position. The cover system of this reference further requires a frame section for extending and advancing the panels to form a protective cover.

Therefore there is a need for a shield cover for a telescopic conveyor system that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a cover shield system for a telescopic conveyor system. In accordance with an aspect of the present invention, there is provided a cover shield system for a conveyor system having a base portion and a telescoping portion, the cover shield system comprising: a cover extendable along the length of the telescoping portion of the conveyor system, said cover formed from a flexible material and configured to substantially span the width of the telescoping portion, said cover having a free end configured for connection to the telescoping portion at a first location; and a shuttle assembly biased to retract the cover for storage, said shuttle assembly being movably mounted to the telescoping portion of the conveyor system to allow relative movement between the shuttle assembly and the telescoping portion in a direction parallel to the length of the telescoping portion, wherein said shuttle assembly is anchored to the base portion at least during extension of the telescoping portion.

In accordance with another aspect of the present invention, there is provided a telescoping conveyor system comprising: a base portion and a telescoping portion each comprising a respective conveyor; a cover extendable and retractable along the length of the telescoping portion, said cover formed from a flexible material and configured to substantially span the width of the telescoping portion, said cover having a free end connected to the conveyor system at a first location; and a shuttle assembly biased to retract the cover for storage, said shuttle assembly being movably mounted to the telescoping portion of the conveyor system to allow relative movement between the shuttle assembly and the telescoping portion in a direction parallel to the length of the telescoping portion, wherein said shuttle assembly is anchored to the base portion at least during extension of the telescoping portion.

DETAILED DESCRIPTION OF THE INVENTION

Figure 1:
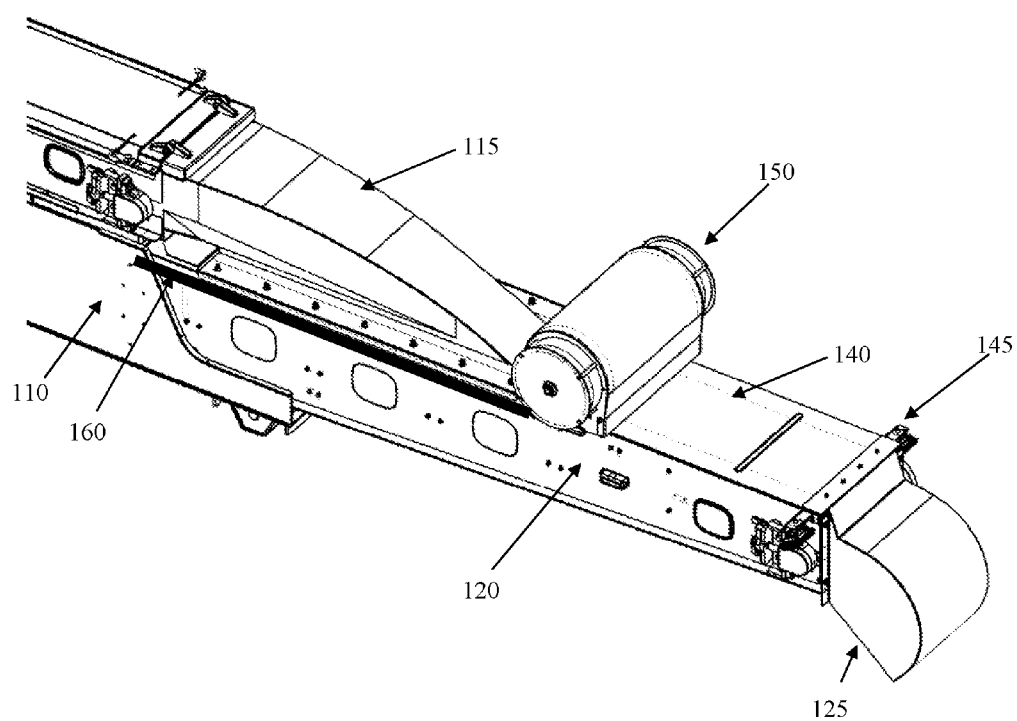
FIG. 1 illustrates a perspective view of the cover shield system installed on a telescoping conveyor system according to embodiments of the present invention, wherein the conveyor system is in a partially extended configuration and the shuttle assembly is anchored to a base portion of the telescoping conveyor system.

The present invention provides a cover shield system for a telescopic conveyor system. The cover shield system according to embodiments of the present invention can mitigate the dispersion of dust during transfer of material by the conveyor system. According to embodiments, the configuration of the cover shield system can provide dust mitigation at substantially all times, even during re-positioning of the conveyor system, for example during extension and contraction of the telescopic conveyor system.

The telescopic conveyor system includes a base portion and a telescoping portion. Both the base portion and the telescoping portion may include their own separate conveyors, such as belt or bucket conveyors, for example with the conveyor of the base portion feeding onto the conveyor of the telescoping portion. In a retracted position, the telescoping portion is nested within the base portion or suspended underneath the base portion. Alternatively, if the material is to flow from the telescoping portion to the base portion, the telescoping portion may be supported on top of the base portion. To move from the retracted position to an extended position, the telescoping portion is moved outward in a direction parallel to the base portion, for example by operation of a motor. For extension, a smaller portion of the length of the telescoping portion is nested within or overlaps with the base portion. To move from the extended position to the retracted position, the telescoping portion is moved in the opposite direction. For retraction, a larger portion of the length of the telescoping portion is nested within or overlaps with the base portion. Configuration and operation of telescoping conveyor systems in general will be readily understood by a worker skilled in the art.

The cover shield system includes a cover formed from a flexible material and configured to substantially span a width of the telescoping portion of the conveyor system. The cover may further be configured to magnetically engage with a longitudinal edge of the conveyor system. The cover shield system further includes a shuttle assembly biased to retract the cover for storage. The shuttle assembly holds a portion of the cover, for example in a rolled-up manner around a rotatable axle, and dispenses the cover for example by rotation of the axle. The bias may be a spring bias tending to rotate the axle in a manner which rolls the cover onto the axle. The shuttle assembly also acts as an anchor location for holding the cover.

The shuttle assembly is movably mounted to the telescoping portion of the conveyor system. The movable mounting may be a slidable mounted, rolling mount for example using wheels or bearings, a track or rail mount, or the like. Furthermore, the shuttle assembly is tethered, anchored or otherwise disposed so that it maintains its position relative to the base portion of the conveyor system. For example, the shuttle may be tethered or anchored to the base portion at least in part via a strap. As such, when the telescoping portion of the conveyor extends or retracts, the shuttle assembly is held stationary while still being supported by the telescoping portion, due to the movable mounting which allows the shuttle portion and the telescoping portion to move relative to each other.

The cover is attached to the conveyor system at a first location, for example at or near the far end (e.g. proximate the discharge chute) of the telescoping portion of the conveyor, which is the end opposite the base portion of the conveyor. During telescopic extension and contraction of the conveyor system, the cover moves with the telescoping portion of the conveyor, while the shuttle assembly remains anchored to the base portion of the conveyor. This results in the extension and retraction of the cover from/into the shuttle assembly because the cover is pulled from or into shuttle assembly.

FIG. 1 illustrates a cover shield system mounted to a telescoping conveyor system according to an embodiment of the present invention. The telescoping conveyor system includes a base portion 110 and a telescoping portion 120 telescopically nested within the base portion. The conveyor system also includes a transition scoop or chute 115 which guides bulk material from one conveyor housed in the base portion to another conveyor housed in the telescoping portion. The conveyor system also includes a discharge chute 125 at the end of the telescoping portion. The cover shield system includes a flexible cover 140 which is anchored at one end 145 (the first location) to the telescoping portion 120 and which is housed at an opposite end within a shuttle assembly 150. Also illustrated in FIG. 1 is a strap 160 which connects the shuttle assembly to the base portion 110.

In more detail with respect to FIG. 1, the shuttle assembly 150 is anchored to the base portion 110 of the telescoping conveyor system using a retractable strap 160. The shuttle assembly 150 can be held at a location adjacent to the transition scoop 115 by adjustment of the strap to have the illustrated length. The strap is affixed at one end to the base portion 110 and at another end to the shuttle assembly 150. By disconnecting the strap or increasing the deployed length of the strap, the shuttle assembly can be allowed to move away from the illustrated location toward the discharge chute 125 to facilitate maintenance of the conveyor and/or storage of the shuttle assembly at a storage location proximate to the discharge chute 125. Alternatively, the shuttle assembly can be removed entirely from the telescoping portion of the conveyor. The strap counters the tensile force in the cover which would otherwise tend to cause the shuttle assembly to move toward the discharge chute 125 due for example to the spring bias within the shuttle assembly. By configuring the length of the strap 160, the shuttle assembly can be disposed at a desired location on the telescoping portion of the conveyor system.

The retractable strap can be connected to the bottom of the shuttle assembly at a first end and anchored at another location which does not alter during extension of the conveyor system. As would be readily understood, a retractable strap can be associated with both sides of the shuttle assembly for alignment purposes.

Figure 5:
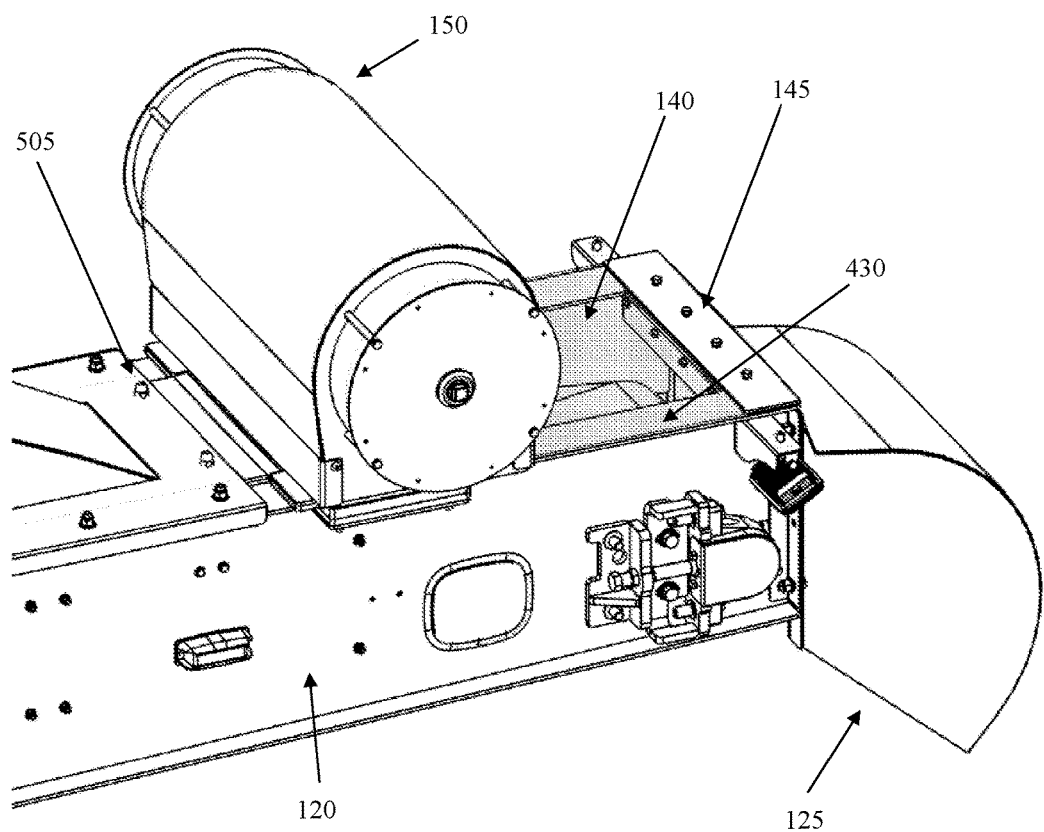
FIG. 5 illustrates a perspective view of the cover shield system installed on a telescoping conveyor system according to embodiments of the present invention, wherein the conveyor system is in a retracted configuration.

When a strap or other flexible means is used to anchor the shuttle assembly to the base portion of the telescoping conveyor, a complementary means of holding the shuttle assembly away from the base portion of the telescoping conveyor during retraction may also be provided. For example, as illustrated in FIG. 5, the shuttle assembly may be connected to the transition scoop via a rigid body, which inhibits the shuttle assembly from being moved overtop of the transition scoop. Alternatively, a bumper system or other body which is connected to the transition scoop or base portion of the telescoping conveyor and which lies across the path of the shuttle assembly may be used to maintain the location of the shuttle assembly generally overtop of the telescoping conveyor portion.

In some embodiments, the shuttle assembly further includes an idler roller which is configured to place the cover proximate to the perimeter of the conveyor system during extension of the conveyor system. This proximate positioning of the cover by the idler roller can enhance the speed of magnetic interconnection between the longitudinal edge of the conveyor system and the cover, thereby further mitigating dust creation and material egress from the conveyor system. The idler roller may be disposed overtop of the cover as it exits the shuttle assembly and is configured, for example using a spring bias, to push on the cover so that it is forced downward toward the conveyor system.

By movably mounting the shuttle assembly on the telescoping portion, the shuttle assembly can be located close to the telescoping portion, while also allowing the distance between the shuttle assembly and the far end of the telescoping portion of the conveyor system to vary, thereby facilitating extension and retraction of the cover.

By mounting the shuttle assembly to the telescoping portion of the conveyor rather than the base portion of the conveyor, the opening of the shuttle assembly from which the cover is dispensed and retracted can be positioned at a location close to the upper surface of the telescoping portion of the conveyor. In some embodiments, this results in the cover being able to enter the shuttle at an angle which is parallel or almost parallel to the conveyor, and the transitional portion of the cover between the shuttle and the conveyor upper surface can be limited or minimized. The shuttle can also be conveniently supported by the telescoping portion of the conveyor.

Mounting the shuttle assembly to the telescoping portion of the conveyor rather than to the base portion also eliminates the need to route the cover from the base portion of the conveyor to the telescoping portion of the conveyor, which would require a complex guide bracket and which would cover the transition scoop/transition chute between the base portion of the conveyor and the telescoping portion of the conveyor.

Cover

As discussed above, the cover is formed from a flexible material and configured to substantially span the width of the conveyor system. The cover is further configured to magnetically engage with a longitudinal edge of the conveyor system. In addition, the cover is connected to the conveyor system at a first location, wherein the first location can be proximate to the far end of the telescoping portion of the conveyor, which may be the discharge end of the conveyor system when material is conveyed from the base portion to the telescoping portion.

According to embodiments, the flexible material of the cover is configured such that it can be rolled up and stored, while also having a desired level of tensile strength and durability for a variety of applications. For example, the tensile strength of the flexible material is sufficient for a tensile force to be substantially maintained within the flexible material, such that the cover can suitably enclose an open face of the conveyor system, while also being resistant to substantial separation from the conveyor system when impacted by material being transported by the conveyor system. In addition, the flexible material is to be sufficiently durable such that abrasion or impact from the material being transported by the conveyor system results in limited degradation of the flexible material. For example, the flexible material can be a fabric, for example a woven fabric, rubber, or other material with a sufficient level of flexibility as would be readily understood by a worker skilled in the art.

In some embodiments, the flexible material is a tarp type of material which is reinforced using a longitudinal woven strap material, which can provide a level of structural integrity along the length of the flexible material. Additionally or alternatively, the reinforcing strap material may be oriented along the width of the flexible material, that is, across the direction of motion of the conveyor. The woven strap material can be integrated into the flexible material at a predetermined interval, such that a desired level of structural integrity is provided.

According to embodiments, the flexible material includes magnetic elements positioned along the edge(s) thereof enabling magnetic interconnection between the flexible material and the longitudinal edge(s) of the conveyor system. The magnetic elements can be anchored to the flexible material or integrated into or embedded within the flexible material. In some embodiments, the magnetic material is positioned along the full length of the flexible material, while having a level of flexibility such that the magnetic material does not impede the retraction of the cover into a stored configuration. In other embodiments, the magnetic material is positioned on the flexible material at predetermined intervals such that a desired level of magnetic interconnection between the flexible material and the conveyor system is provided, for example such that there is minimal or no separation between the flexible material and the conveyor system during standard operation of the conveyor system and the cover shield system. The magnetic elements can be permanent magnets or other type of magnetic material as would be readily understood by a worker skilled in the art. The selection of the magnetic elements can be based on the desired application of the conveyor system, tensile strength of the flexible material or other parameter or combination thereof. In some embodiment, the magnetic elements are integrated with the woven strap material.

In some embodiments, instead of using magnetic material for the interconnection between the flexible material and the conveyor system, push down mechanical clips may be used, for example a button clasp, hook and loop fastener, or other type of connector as would be readily understood by a worker skilled in the art. The selection of the type of material connector can depend on the strength of the mechanical clip during use as well as ease of substantially automatic engagement and disengagement of the mechanical clip during extension and retraction of the flexible material.

Figure 2:
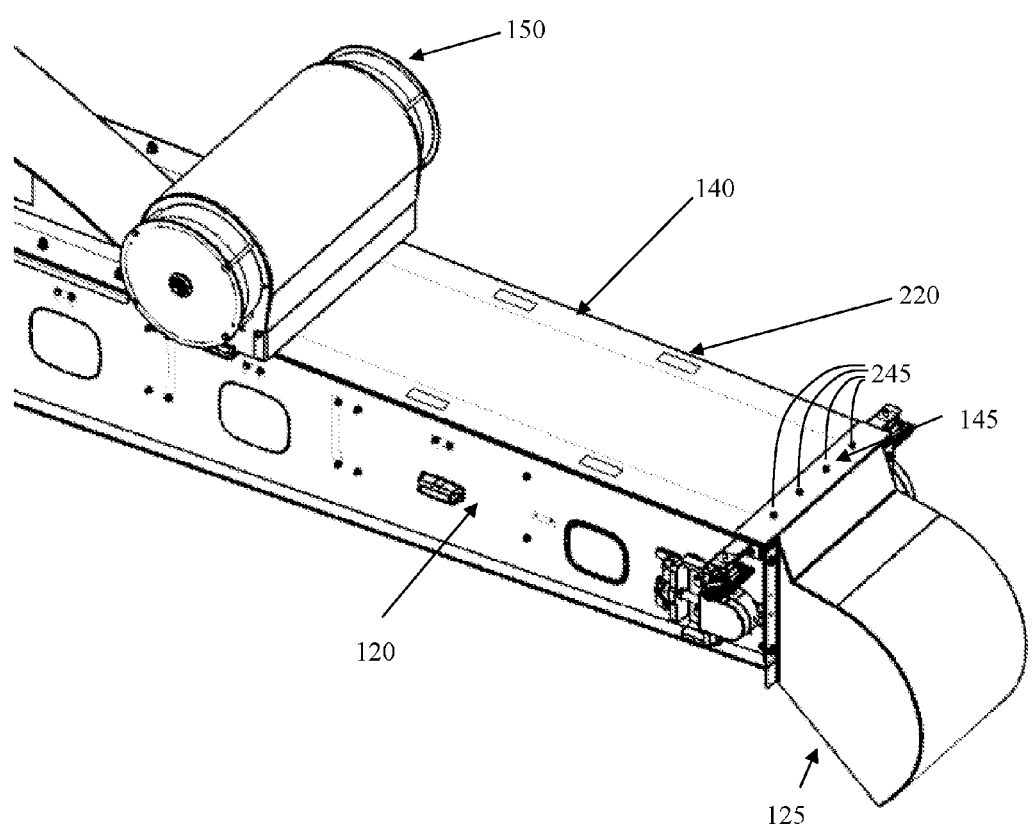
FIG. 2 illustrates a perspective view of the cover shield system installed on a telescoping conveyor system according to embodiments of the present invention, wherein the conveyor system is in a partially extended configuration.

FIG. 2 illustrates the cover according to an embodiment of the present invention, wherein the cover 140 formed from a flexible material includes a plurality of magnetic elements 220, which are positioned along the longitudinal edges of the flexible material. The cover is anchored to the conveyor system at a first location 145 proximate to the discharge chute 125 of the telescoping portion 120 of the conveyor system by a cover anchorage 245. The anchorage can provide reversible interconnection, for example by bolts, screws or other type of anchorage device, to the conveyor system, thereby providing a means for the removal of the cover for replacement, for example. The cover is dispensed from and retracted by the shuttle assembly 150, which provides a second anchoring location for the cover.

Figure 3:
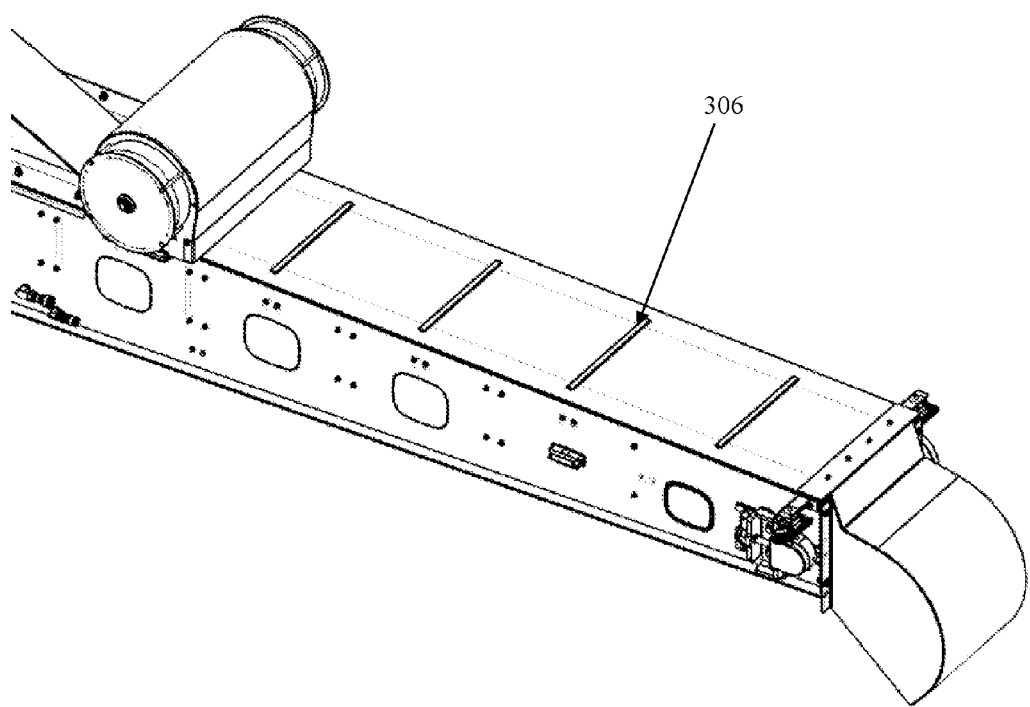
FIG. 3 illustrates a perspective view of the cover shield system installed on a conveyor system according to embodiments of the present invention, wherein the cover is structurally reinforced.

In some embodiments, as illustrated in FIG. 3, the cover further includes structural reinforcement components 306 which span the width of the flexible material. The structural reinforcing components may be provided at intervals along the length of the cover. These structural reinforcement components can be configured as bars or plates which, upon placement of the cover on the longitudinal edge of the conveyor system, bear on the conveyor system, which can provide for resistance to external loading placed on the cover. This external loading can be snow loading of other type of external loading conditions that may be experienced during operation of the conveyor system. Additionally or alternatively, flexible structural components can be provided which are oriented along the conveyor longitudinal axis, i.e. in the direction of conveyor motion.

Shuttle Assembly

The cover shield system further includes a shuttle assembly biased to retract the cover for storage, wherein the shuttle assembly is movably mounted to the telescoping portion of the conveyor system as explained above. The mounting may comprise a lower surface of the shuttle assembly which is slidable on an upper surface of the telescoping portion of the conveyor system. The mounting may comprise wheels, rollers, or bearings attached to one of the shuttle assembly and the telescoping portion of the conveyor system; and a corresponding track, rail, or other bearing surface formed on the other of the shuttle assembly and the telescoping portion of the conveyor system.

The shuttle assembly is movably mounted to and supported by the telescoping portion of the conveyor. The shuttle assembly is also anchored to the base portion of the conveyor. Therefore, when the telescoping portion of the conveyor extends or retracts, the shuttle assembly remains stationary relative to the base portion of the conveyor. This can also be viewed as the shuttle assembly moving relative to the frame of the telescoping portion of the conveyor upon extension/retraction, in the direction opposite the extension/retraction.

Alternatively to an anchor or tether which holds the shuttle assembly stationary relative to the base portion, motorized wheels or a motorized system of gears, or the like, can be used to drive the shuttle assembly in the direction opposite the extension/retraction at a speed equal to the speed of the extension/retraction. A feedback control circuit may be used to actuate the driving of the shuttle assembly based on a sensed location of the shuttle assembly, thereby maintaining a stationary position of the shuttle assembly relative to the base portion of the conveyor, during extension/retraction of the telescoping portion of the conveyor.

The shuttle assembly includes a storage drum or rollup barrel, which is configured to rotate during the extension and retraction of the cover from the shuttle assembly. The storage drum is biased to retract the cover, thereby providing a tensile force within the cover while also aiding with the retraction of the cover into a stored configuration during contraction of the conveyor system.

According to embodiments, the storage drum is biased by a passive bias mechanism for example a spring, clock spring or other passive biasing mechanism as would be readily understood by a worker skilled in the art. According to other embodiments, the bias mechanism is an active bias mechanism for example a rotation actuator or motor or other active rotational device as would be readily understood by a worker skilled in the art. The operation of an active bias mechanism can occur substantially simultaneously with the extension or contraction of the conveyor system. The speed and direction of the motor can be adjusted based on feedback to let out the cover during conveyor extension and to take in the cover during conveyor retraction, at a rate which imparts a substantially constant level of tension into the cover.

According to embodiments, the storage drum includes two bias mechanism positioned on opposite ends of the storage drum, which can provide for a substantially even distribution of the tensile force across the width of the cover while also mitigating issues relating to rotational binding of the storage drum during retraction of the cover. In some embodiments, the bias mechanism is positioned on a single side of the storage drum.

According to some embodiments, the biasing mechanism is configured such that the level of bias can be adjustable. For example, in embodiments where the biasing mechanism is a clock spring and the storage drum, an adjustment shaft interconnected to the clock spring, can provide for increasing or decreasing the bias. For example, rotation of the adjustment shaft can adjust the bias applied to the cover. In some embodiments, the adjustment shaft can include a locking position, thereby effectively disengaging the biasing mechanism from the cover for maintenance of other work to be performed on the shuttle assembly. The biasing mechanism may be configured to impart a substantially constant level of tension into the cover.

In some embodiments, a brake is provided for inhibiting undesired extension of the cover from the shuttle for example due to wind or another force acting on the deployed portion of the cover. The brake can be engaged to resist such force, with the resistance from the brake adding to the resistance provided by the spring.

The brake may be coupled directly or indirectly to the drum shaft, and may include a ratcheting mechanism, for example. The brake may be controllably or automatically engaged.

According to embodiments, the telescoping portion of the conveyor is configured to move (e.g. slide) underneath the shuttle assembly during telescopic extension or contraction. In this manner, during extension or contraction, the anchor point of the cover to the telescoping portion of the conveyor (the first location) moves away from or toward the shuttle assembly, respectively. This causes the cover to be pulled from or pulled into the shuttle assembly. In some embodiments, the movable interconnection between the shuttle assembly and the telescoping portion of the conveyor system is provided by a roller bearing system, endless track system, sliding rail system or contacting slidable components with a desired limited or minimal frictional coefficient therebetween. As would be readily understood, the movable interconnection can be required on the upper side and lower side of the longitudinal edge of the conveyor system in order that a desired level of stability is provided to the shuttle assembly.

Figure 4:
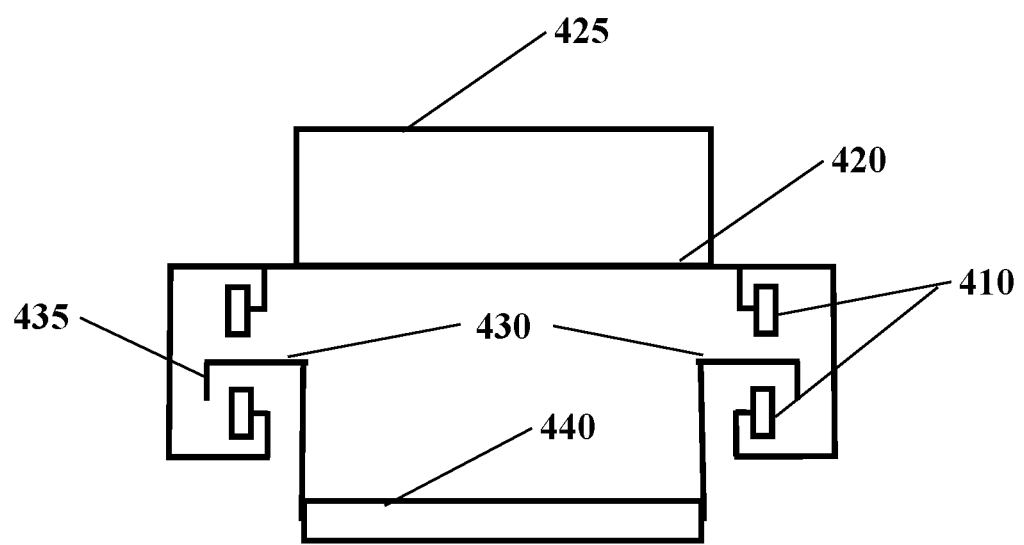
FIG. 4 illustrates a movable mounting system for the shuttle assembly according to an embodiment of the present invention.

FIG. 4 illustrates a cross-sectional view of a track mounting of the shuttle assembly in accordance with one embodiment. Wheels or bearings 410 may be mounted to a platform 420 which holds the shuttle assembly 425. The wheels rest on upper and lower faces of perimeter rails/tracks 430 which are integrated into the telescoping portion 440 of the conveyor and which extend in the longitudinal direction. As illustrated, additional side brackets 435 may be provided which maintain the position of the shuttle assembly on the tracks.

A worker skilled in the art would readily understand other mechanisms that would provide a desired level of relative slidability between the shuttle assembly and the conveyor system. In some embodiments, brushes or cleaning mechanism can be positioned proximate to and on the outer regions of the slidable components for at least partial removal or movement of material that may collect on the longitudinal edge of the conveyor system, thereby reducing the probability of ingress of contaminants into the slidable components.

According to embodiments of the present invention, FIG. 5 illustrates a perspective view of the cover shield system installed on a conveyor system, wherein the conveyor system is in a substantially contracted configuration. FIG. 5 can be compared with FIG. 2, which illustrates the cover shield system in a partially extended configuration. Having reference now to both figures, the shuttle assembly 150 is movably mounted to the telescoping portion 120 of the conveyor system. The cover 140 is connected to the conveyor system at the first location 145 proximate to the discharge chute 125. As noted above, the distance between the shuttle assembly 150 and the first location 145 changes during extension and contraction of the telescopic conveyor system, resulting in the deployment and retraction of the cover out of and into the shuttle assembly. The cover 140 is illustrated in a partially transparent manner to illustrate components below the cover.

As also illustrated in FIG. 5, the shuttle assembly can be connected to the transition scoop and/or base portion of the conveyor system by connectors 505, in a permanent or reversible type of connection, which can be provided by bolts, screws, rivets, pins or the like as would be readily understood. A protruding section of the shuttle assembly can be anchored to the transition scoop, thereby maintaining the location of the shuttle assembly relative to the transition scoop and base portion (by way of anchoring of the transition scoop to the base portion).

Figure 6:
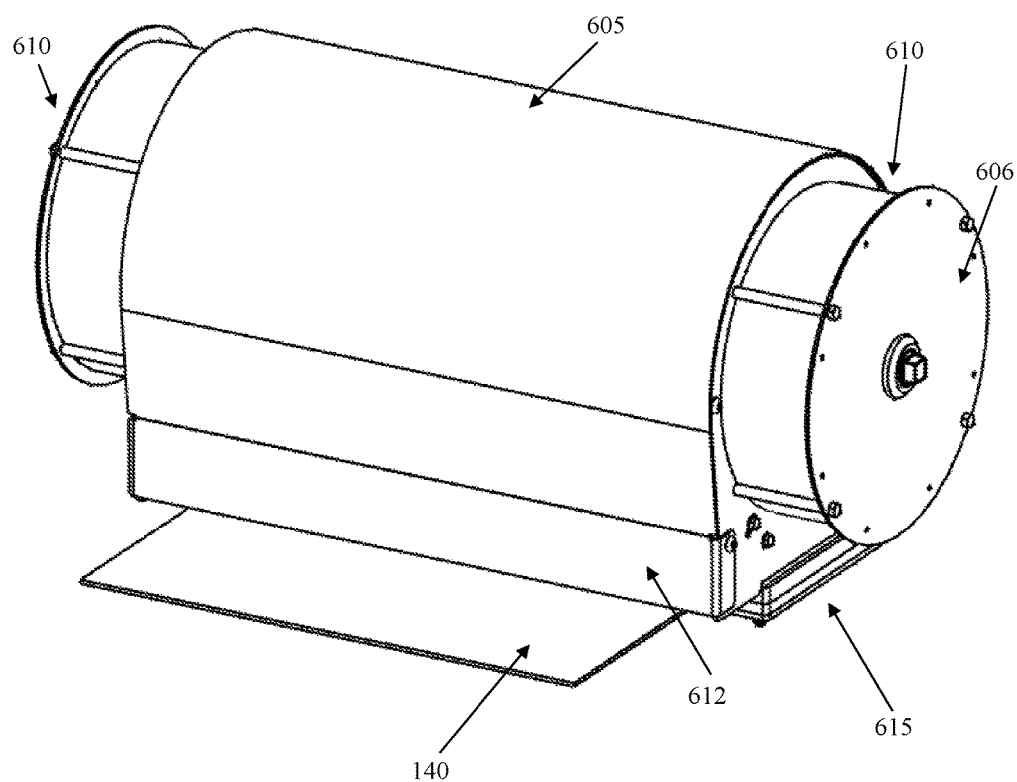
FIG. 6 illustrates a perspective view of a shuttle assembly for holding the cover, according to embodiments of the present invention.
Figure 7:
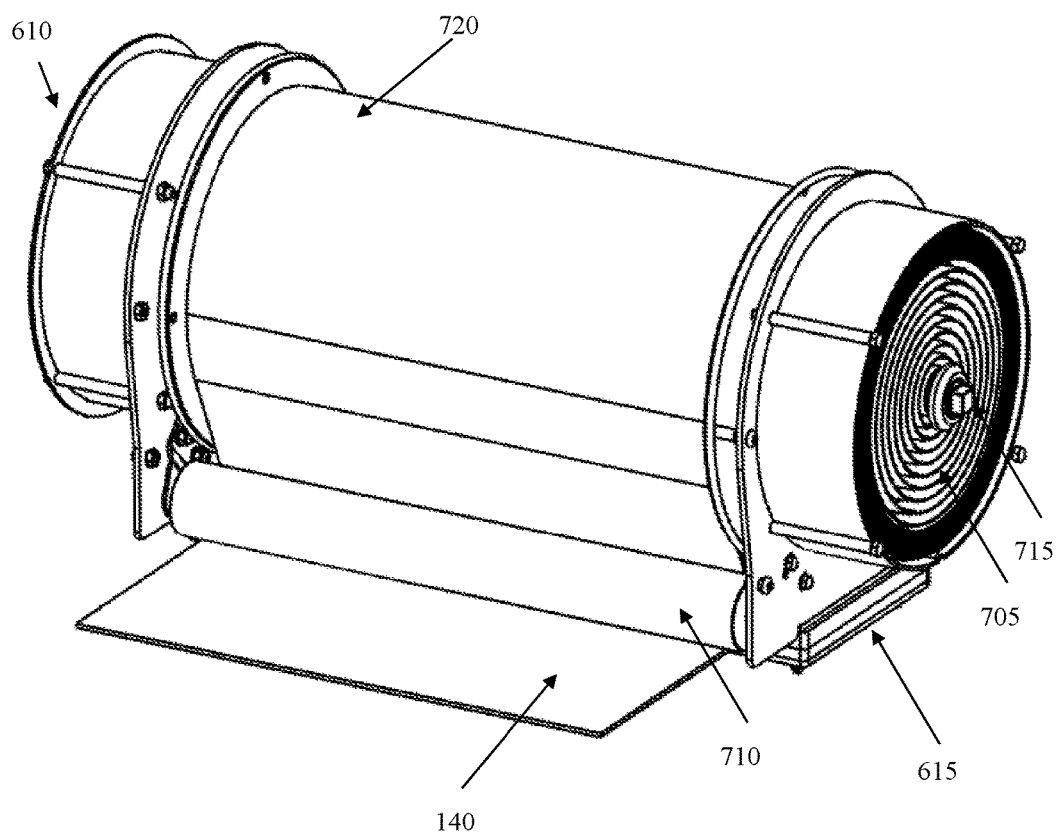
FIG. 7 illustrates another view of the shuttle assembly according to embodiments of the present invention, with outer coverings removed.

FIGS. 6 and 7 illustrate perspective views of the shuttle assembly according to embodiments of the present invention. The retraction actuators 610 are positioned at the ends of the rollup barrel 720 (shown in FIG. 7) in order to provide substantially even biasing across the rollup barrel, thereby applying a substantially even tension force across the width of the cover. The retraction actuators are covered with end caps 606. The shuttle assembly further includes a shuttle cover/shield 605, which has integrated therewith a lower shield 612 which is positioned proximate to the entrance/exit location of the cover and connected to the shuttle cover/shield in a fixed configuration or a rotatable configuration. The lower shield can further limit the ingress of contaminants into the internal region of the shuttle assembly. For example the lower shield can inhibit potential contamination from entering the shuttle assembly during retraction of the cover. In embodiments where the lower shield is rotatable, this rotatability can potentially reduce the effect of binding of the cover 140 during extension and contraction thereof. The sliding rail system 615 provides for relative movement of the shuttle assembly along the perimeter tracks/rails 430 (as shown in FIGS. 4 and 5) of the conveyor system while also providing a level of rotational stability to the shuttle assembly.

In FIG. 7, the shuttle cover 605 and end cap 606 have been removed, thereby exposing the rolled-up stored portion 720 of the cover 140 and the clock spring 705. The cover is wrapped around a central rotatable axle 715, the axle being coupled to the clock spring 705. The shuttle assembly further includes an idler roller 710 which is configured to place the cover proximate to the perimeter of the conveyor system during extension of the conveyor system.

As would be readily understood, the cover shield system according to the present invention can be used in a plurality of applications, which include telescopic or extendable conveyor systems. The movable connection of the shuttle assembly to a structure housing a conveyor system results in a cover which can extend and retract along with extension and contraction of the telescoping conveyor system, respectively.

It should be readily understood that the movable shuttle assembly can be adapted to receive and dispense other types of covers, such as a cover formed from a connected series of rigid, foldable cover sections. In general, the movable shuttle assembly serves as a storage location for a currently unused portion of a cover, in particular such that the shuttle assembly is movably mounted on the telescoping conveyor portion.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

What is claimed is:

1. A cover shield system for a conveyor system having a base portion and a telescoping portion, the cover shield system comprising:
a cover extendable along the length of the telescoping portion of the conveyor system, said cover formed from a flexible material and configured to substantially span the width of the telescoping portion, said cover having a free end configured for connection to the telescoping portion at or proximate to a discharge end of the telescoping portion; and
a shuttle assembly biased to retract the cover for storage, said shuttle assembly being movably mounted to the telescoping portion of the conveyor system to allow relative movement between the shuttle assembly and the telescoping portion in a direction parallel to the length of the telescoping portion, wherein said shuttle assembly is anchored to the base portion in said direction parallel to the length of the telescoping portion at least during extension of the telescoping portion.

2. The cover shield system according to claim 1, wherein said shuttle assembly is mounted to the telescoping portion using a slidable mount or a rolling mount.

3. The cover shield system according to claim 1, wherein said free end is configured for removable connection to the conveyor system at or proximate to a discharge end of the telescoping portion.

4. The cover shield system according to claim 1, wherein the cover further comprises one or more reinforcement components extending width-wise relative to the cover.

5. The cover shield system according to claim 4, wherein the reinforcement components are bars provided at intervals along the length of the cover.

6. The cover shield system according to claim 1, wherein the cover further comprises one or more connecting members proximal to one or more longitudinal edges of the cover for interconnection between the cover and the telescoping portion of the conveyor system.

7. The cover shield system according to claim 6, wherein said one or more connecting members are a plurality of magnetic elements attached to the cover.

8. The cover shield system according to claim 1, wherein said shuttle assembly comprises a rollup barrel configured to rotate during the extension and retraction of the cover, and to receive and retain the cover during storage.

9. The cover shield system according to claim 8, wherein said rollup barrel is biased via a passive biasing mechanism or an active biasing mechanism.

10. The cover shield system according to claim 9, wherein said biasing mechanism is configured to provide an adjustable level of bias.

11. The cover shield system according to claim 10, wherein said biasing mechanism comprises a clock spring and an adjustment shaft connected to the clock spring for adjusting the bias by rotation of the adjustment shaft.

12. The cover shield system according to claim 11, wherein said adjustment shaft further includes a locking position to effectively disengage the biasing mechanism from the cover.

13. The cover shield system according to claim 1, further comprising a brake to inhibit extension of the cover from the shuttle assembly.

14. The cover shield system according to claim 1, wherein the shuttle assembly further comprises an idler roller positioned overtop of the cover and configured to press the cover toward to the perimeter of the conveyor system.

15. The cover shield system according to claim 1, wherein the shuttle assembly further comprises a lower shield positioned proximate to an aperture for receiving the cover into the shuttle assembly, the lower shield connected to the shuttle assembly in a rotatable configuration.

16. A telescoping conveyor system comprising:
a base portion and a telescoping portion each comprising a respective conveyor;
a cover extendable and retractable along the length of the telescoping portion, said cover formed from a flexible material and configured to substantially span the width of the telescoping portion, said cover having a free end connected to the conveyor system at a first location; and
a shuttle assembly biased to retract the cover for storage, said shuttle assembly being movably mounted to the telescoping portion of the conveyor system to allow relative movement between the shuttle assembly and the telescoping portion in a direction parallel to the length of the telescoping portion, wherein said shuttle assembly is anchored to the base portion at least during extension of the telescoping portion.

17. The telescoping conveyor system according to claim 16, wherein said shuttle assembly is mounted to the telescoping portion using a slidable mount or a rolling mount, and wherein the telescoping portion comprises a track or rail for operative coupling with the slidable mount or the rolling mount.

18. The telescoping conveyor system according to claim 16, wherein the cover further comprises one or more magnets proximal to one or more longitudinal edges of the cover for interconnection between the cover and the telescoping portion of the conveyor system.

19. The telescoping conveyor system according to claim 16, wherein said shuttle assembly comprises a rollup barrel configured to rotate during the extension and retraction of the cover, and to receive and retain the cover during storage.

20. The telescoping conveyor system according to claim 16, wherein the shuttle assembly further comprises an idler roller positioned overtop of the cover and configured to press the cover toward to the perimeter of the conveyor system.

21. The cover shield system according to claim 1, wherein said shuttle assembly is anchored to the base portion via a strap.

22. The telescoping conveyor system according to claim 16, wherein the first location is at or proximate to a discharge end of the telescoping portion.

* * * * *